US011823448B2

(12) United States Patent
Wolfson et al.

(10) Patent No.: US 11,823,448 B2
(45) Date of Patent: Nov. 21, 2023

(54) AGRICULTURAL CROP IDENTIFICATION USING SATELLITE AND CROP ROTATION

(71) Applicant: International Business Machines Corporation, Armonk, NY (US)

(72) Inventors: Charles Daniel Wolfson, Austin, TX (US); David Alec Selby, Fareham (GB); Kevin Brown, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 17/243,799

(22) Filed: Apr. 29, 2021

(65) Prior Publication Data

US 2022/0366184 A1 Nov. 17, 2022

(51) Int. Cl.
*G06F 18/22* (2023.01)
*G06T 7/00* (2017.01)
(Continued)

(52) U.S. Cl.
CPC ........ *G06V 20/188* (2022.01); *G06F 18/2163* (2023.01); *G06F 18/22* (2023.01); *G06T 3/40* (2013.01); *G06T 7/0002* (2013.01); *G06T 7/11* (2017.01); *G06V 10/58* (2022.01); *G06V 10/761* (2022.01); *G06V 20/17* (2022.01);
(Continued)

(58) Field of Classification Search
None
See application file for complete search history.

(56) References Cited

U.S. PATENT DOCUMENTS 10,127,451 B1 * 11/2018 Sinnott ............... G06V 20/188
11,449,515 B1 *  9/2022 Russell ................ G06F 16/90
(Continued)

FOREIGN PATENT DOCUMENTS

CN      108985588 A    12/2018
WO   2019081567 A1     5/2019

OTHER PUBLICATIONS

Fan J, Zhang X, Zhao C, Qin Z, De Vroey M, Defourny P. Evaluation of crop type classification with different high resolution satellite data sources. Remote Sensing. Feb. 28, 2021;13(5):911. (Year: 2021).*

(Continued)

*Primary Examiner* — Emily C Terrell
*Assistant Examiner* — Nathan J Bloom
(74) *Attorney, Agent, or Firm* — Stephanie L. Carusillo (57) ABSTRACT

In an approach for identifying a crop using satellite observation data and crop rotation data, a processor receives an aerial image of one or more agricultural fields in a predetermined geographical region from an optical satellite. A processor selects a plurality of points from the aerial image. A processor clips the aerial image into one or more smaller images to generate one or more observed signatures. A processor determines there is a change in a spatial distribution of one or more crops. A processor generates an actual signature from the one or more observed signatures. A processor cross-correlates the actual signature against a plurality of historical reference signatures to determine a degree of similarity. A processor ranks one or more results of the cross-correlation. A processor identifies the one or more crops. A processor calculates a first estimate of an amount of the one or more crops.

20 Claims, 4 Drawing Sheets

(51) Int. Cl.

| | |
|---|---|
| *G06V 20/10* | (2022.01) |
| *G06F 18/21* | (2023.01) |
| *G06V 10/58* | (2022.01) |
| *G06V 10/74* | (2022.01) |
| *G06V 20/68* | (2022.01) |
| *G06V 20/17* | (2022.01) |
| *G06T 3/40* | (2006.01) |
| *G06T 7/11* | (2017.01) |

(52) U.S. Cl.
CPC ........... *G06T 2207/10032* (2013.01); *G06T 2207/10036* (2013.01); *G06T 2207/20081* (2013.01); *G06T 2207/30188* (2013.01); *G06V 20/68* (2022.01)

(56) References Cited

U.S. PATENT DOCUMENTS

| | | | |
|---|---|---|---|
| 2014/0012732 A1 | 1/2014 | James | |
| 2016/0202227 A1* | 7/2016 | Mathur | A01B 79/005 702/2 |
| 2017/0161627 A1* | 6/2017 | Xu | G06Q 10/04 |
| 2018/0189564 A1* | 7/2018 | Freitag | G06F 18/214 |
| 2019/0303713 A1* | 10/2019 | Kumar | G06V 40/10 |
| 2020/0359582 A1* | 11/2020 | Tran | A01G 22/00 |
| 2021/0201024 A1* | 7/2021 | Lin | G06F 18/22 |
| 2021/0235612 A1* | 8/2021 | Tewari | G06Q 50/02 |
| 2023/0049590 A1* | 2/2023 | Bauer | G06V 10/82 |

OTHER PUBLICATIONS

Hao, Pengyu, et al. "Using historical NDVI time series to classify crops at 30m spatial resolution: A case in Southeast Kansas." 2016 IEEE International Geoscience and Remote Sensing Symposium (IGARSS). IEEE, Jul. 2016 (Year: 2016).*

Akbari, Elahe, et al. "Crop mapping using random forest and particle swarm optimization based on multi-temporal Sentinel-2." Remote Sensing 12.9 (May 2020): 1449. (Year: 2020).*

Saxena V, Dwivedi RK, Kumar A. Analysis of Machine Learning Algorithms for Crop Mapping on Satellite Image Data. In2021 10th International Conference on System Modeling & Advancement in Research Trends (SMART) Dec. 10, 2021 (pp. 23-28). IEEE. (Year: 2021).*

Liu Z, Zhang L, Yu Y, Xi X, Ren T, Zhao Y, Zhu D, Zhu AX. Cross-Year Reuse of Historical Samples for Crop Mapping Based on Environmental Similarity. Frontiers in Plant Science. Mar. 4, 2022;12:3447. (Year: 2022).*

Wikipedia, "Crop rotation", Wikipedia, Accessed on Jan. 29, 2021, 12 Pages.

Lozano Tello et al., "Crop identification by massive processing of multiannual satellite imagery for EU common agriculture policy subsidy control", European Journal of Remote Sensing, vol. 54, No. 1, Dec. 30, 2020, 13 Pages.

IBM, "IBM Watson Decision Platform for Agriculture adds IBM Watson Decision Platform for Agriculture—Crop Forecast, enabling better business decisions with analytics such as crop acreage determination and yield forecast at a regional level", IBM, Grace Period Disclosure, May 19, 2020, 6 Pages.

\* cited by examiner

AGRICULTURAL CROP IDENTIFICATION USING SATELLITE AND CROP ROTATION

STATEMENT REGARDING PRIOR DISCLOSURES BY INVENTORS

The following disclosure(s) are submitted under 35 U.S.C. § 102(b)(1)(A):
"IBM Watson Decision Platform for Agriculture adds IBM Watson Decision Platform for Agriculture—Crop Forecast, enabling better business decisions with analytics such as crop acreage determination and yield forecast at a regional level," May 19, 2020.

BACKGROUND OF THE INVENTION

The present invention relates generally to the field of data processing, and more particularly to identifying a crop using satellite observation data and crop rotation data.

SUMMARY

Aspects of an embodiment of the present invention disclose a method, computer program product, and computer system for identifying a crop using satellite observation data and crop rotation data. A processor receives an aerial image of one or more agricultural fields in a pre-determined geographical region from an optical satellite at a pre-determined interval of time during a growing season of one or more crops. A processor selects a plurality of points across the one or more agricultural fields in the pre-determined geographical region from the aerial image. A processor clips the aerial image into one or more smaller images focusing on the plurality of points selected across the one or more agricultural fields in the pre-determined geographical region. A processor generates one or more observed signatures from the one or more smaller images focused on the plurality of points selected across the one or more agricultural fields in the pre-determined geographical region. A processor determines there is a change in a spatial distribution of the one or more crops growing at the plurality of points selected across the one or more agricultural fields in the pre-determined geographical region. A processor generates an actual signature from the one or more observed signatures. A processor cross-correlates the actual signature against a plurality of historical reference signatures to determine a degree of similarity between the actual signature and the plurality of historical reference signatures. A processor produces a value from a cross-correlation of the actual signature against the plurality of historical reference signatures. A processor ranks one or more results of the cross-correlation of the actual signature against the plurality of historical reference signatures based on the value produced. A processor identifies the one or more crops growing in the one or more agricultural fields in the pre-determined geographical region. A processor calculates a first estimate of an amount of the one or more crops growing in the one or more agricultural fields in the pre-determined geographical region.

In some aspects of an embodiment of the present invention, prior to receiving the aerial image, a processor gathers the plurality of historical reference signatures for the one or more agricultural fields in the pre-determined geographical region. A processor finds a crop rotation pattern for the one or more agricultural fields in the pre-determined geographical region. A processor predicts the one or more crops growing in the one or more agricultural fields in the pre-determined geographical region based on the crop rotation pattern. A processor calculates a second estimate of an amount of the one or more crops predicted to be growing in the one or more agricultural fields in the pre-determined geographical region. A processor produces one or more reference sets of crop rotations for the one or more agricultural fields in the pre-determined geographical region. A processor assigns a rotation probability to the one or more reference sets of crop rotations for the one or more agricultural fields in the pre-determined geographical region. A processor stores the one or more reference sets of crop rotations for the one or more agricultural fields in the pre-determined geographical region in a database.

In some aspects of an embodiment of the present invention, subsequent to calculating the first estimate, a processor outputs information on the one or more crops growing in the one or more agricultural fields in the pre-determined geographical region and the first estimate of the amount of the one or more crops growing in the one or more agricultural fields in the pre-determined geographical region. A processor stores the information on the one or more crops growing in the one or more agricultural fields in the pre-determined geographical region and the first estimate of the one or more crops growing in the one or more agricultural fields in the pre-determined geographical region in the database.

In some aspects of an embodiment of the present invention, the optical satellite is a Sentinel-2 satellite at 10 m resolution.

In some aspects of an embodiment of the present invention, a processor calculates an Enhanced Vegetation Index of the one or more observed signatures using a formula $$EVI = G \times \frac{\rho_{nir} - \rho_{red}}{\rho_{nir} + (C_1 \times \rho_{red} - C_2 \times \rho_{blue}) + L}.$$

A processor compares the Enhanced Vegetation Index of the one or more observed signatures to the Enhanced Vegetation Index of the plurality of historical reference signatures.

In some aspects of an embodiment of the present invention, the cross-correlation of the actual signature against the plurality of historical reference signatures is defined as $(f*g)(\tau) \triangleq \int_{-\infty}^{\infty} \overline{f(t)} g(t+\tau) dt$; $\overline{f(t)}$ denotes the complex conjugate of $f(t)$; and $\tau$ is a displacement.

In some aspects of an embodiment of the present invention, the value produced from the cross-correlation of the actual signature against the plurality of historical reference signatures ranges from zero to one, in which zero indicates no correlation and one indicates complete correlation, between the actual signature and the plurality of historical reference signatures.

In some aspects of an embodiment of the present invention, the one or more results of the cross-correlation of the actual signature against the plurality of historical reference signatures are ranked from no correlation to complete correlation based on the value produced.

In some aspects of an embodiment of the present invention, the one or more crops identified as the one or more crops growing in the one or more agricultural fields in the pre-determined geographical region is the highest ranked historical reference signature.

DETAILED DESCRIPTION

Embodiments of the present invention recognize that identification of a crop at the beginning of a growing season allows for a check on the crop's health as well as for an estimation of the predicted crop yield prior to harvest. A crop is a plant or a plant product that can be grown and harvested for profit or subsistence. Categorized by use, crops include, but are not limited to, food crops (e.g., fruit, vegetables, and grains), feed crops (e.g., oats and alfalfa), fiber crops (e.g., cotton, hemp, and flax), oil crops (e.g., canola and corn), ornamental crops (e.g., dogwood and azalea), and industrial crops (e.g., rubber and tobacco). Embodiments of the present invention recognize that this information is necessary for farmers and for agricultural companies involved in food production to quantify how much of a crop will be available before yield impacts because the supply level will drive the seasonal sales price.

Embodiments of the present invention recognize that remote sensing has been used in agricultural monitoring as a non-destructive means of gathering recurrent information on a local and a global scale in a systematic way. Remote sensing, more specifically, is the gathering of images of an area otherwise inaccessible via remote sensors on satellites and aircrafts. The remote sensors monitor the physical characteristics of an area and detect changes by measuring the area's reflected and emitted radiation. The images that are gathered are timely, objective, and provide pertinent farm level information to farmers as well as agricultural management systems to use when monitoring plant growth, assessing soil moisture, predicting crop disease, avoiding waste of farm inputs, such as water, fertilizer, and pesticides, and forecasting crop yield.

The Copernicus Sentinel-2 mission (hereinafter referred to as "Sentinel-2") is a commonly used mission in agricultural monitoring. Sentinel-2 is a multispectral operational imaging mission in the Global Monitoring for Environment and Security program, which is jointly implemented by the European Commission and the European Space Agency. Sentinel-2 is comprised of a constellation of two-polar orbiting satellites, Sentinel-2A and Sentinel-2B. Sentinel-2A was launched by the European Space Agency on Jun. 23, 2015 and operates in a sun-synchronous orbit at an altitude of 786 km with a 10-day repeat cycle. Sentinel-2B was launched by the European Space Agency on Mar. 7, 2017 and is operational with data acquisitions available on Earth Explorer.

Sentinel-2A and Sentinel-2B operate together to acquire imagery of all of the Earth's land surfaces and coastal waters at high spatial resolution in a five-day period. Sentinel-2A and Sentinel-2B have a multi-spectral instrument (MSI), which measures the Earth's land surface reflectance in thirteen spectral bands ranging from Visible and Near-Infrared (VNIR) to Shortwave Infrared (SWIR) wavelengths along a 290-km orbital swath.

Land surface reflectance is the amount of light reflected by the surface of the Earth. It is a ratio of surface radiance to surface irradiance, and as such is unitless, with values between 0 and 1. Land surface reflectance provides for a comparison between multiple images over the same region and accounts for atmospheric effects such as aerosol scattering and thin clouds in the comparison images. For example, land surface reflectance is used when measuring the greenness of vegetation, which can also be used to determine phenological transition dates including the start of a season, the peak period of the season, and the end of the season. Land surface reflectance also provides the input for the generation of several land products such as Vegetation Indices.

The thirteen spectral bands of the MSI determine the level of spatial resolution. There are four VNIR bands (i.e., blue at 490 nm, green at 560 nm, red at 665 nm, and near-infrared at 842 nm) at 10 m resolution. There are six red-edge and shortwave infrared bands (i.e., four narrow bands for vegetation characterization at 705 nm, 740 nm, 783 nm, and 865 nm and two larger SWIR bands at 1,610 nm and 2,190 nm) at 20 m resolution. There are three cloud screening and atmospheric correction bands (i.e., 443 nm for aerosols, 945 nm for water vapor, and 1375 nm for cirrus detection) at 60 m resolution. The MSI captures multi-spectral satellite images of the Earth's land surfaces and coastal waters. From the multi-spectral images, data is extracted and used to monitor plant growth through the determination of various plant indices, to map changes in land cover, and to provide information on pollution in lakes and coastal waters, among other uses.

Embodiments of the present invention recognize that crop identification from multi-spectral satellite images has been done using Machine Learning. In at least one method, the multi-spectral satellite images are used to calculate the Normal Differentiated Vegetation Index.

A Vegetation Index is a spectral calculation of two or more bands of light. The Vegetation Index is designed to maximize sensitivity to the vegetation characteristics while minimizing confounding factors such as soil background reflectance, directional, or atmospheric effects. By doing so, the Vegetation Index highlights the vegetation's properties and allows reliable spatial and temporal inter-comparisons of terrestrial photosynthetic activity and canopy structure variations.

The Normalized Difference Vegetation Index (hereinafter referred to as "NDVI") is an indicator of photosynthetically active biomass and is used when calculating vegetation health. The NDVI allows for visualizing vegetated areas, differentiating vegetation from other types of land cover (i.e., artificial land covers), determining the vegetation's overall state, and detecting abnormal changes in the vegetation's growth process.

The NDVI quantifies the density of plant growth on Earth. To determine the density of plant growth, researchers observe the distinct colors (i.e., the wavelengths) of visible and near-infrared sunlight reflected by the plants. When sunlight strikes an object, certain wavelengths of the spectrum are absorbed, and other wavelengths are reflected. The pigment in a plant's leaves (i.e., chlorophyll) strongly absorb the visible light (i.e., from 0.4 to 0.7 µm). The cell structure of the plant's leaves, on the other hand, strongly reflects near-infrared light (from 0.7 to 1.1 µm). The more leaves a plant has, the more these wavelengths of light are affected, respectively. Once this information is collected, researchers can quantify the photosynthetic capacity of the vegetation in a given pixel of land surface.

The NDVI quantifies the density of plant growth on Earth in ratio format—near-infrared radiation $\rho_{nir}$ minus visible radiation $\rho_{red}$ divided by near-infrared radiation $\rho_{nir}$ plus visible radiation $\rho_{red}$. Written mathematically, the formula for NDVI is:

$$NDVI = \frac{\rho_{nir} - \rho_{red}}{\rho_{nir} + \rho_{red}}$$

and can be rewritten as:

$$NDVI = \frac{\frac{\rho_{nir}}{\rho_{red}^{-1}}}{\frac{\rho_{nir}}{\rho_{red}^{+1}}}$$

Embodiments of the present invention provide a system and method to build a reference set of crop rotations from a plurality of historical reference signatures recorded for one or more agricultural fields in a pre-determined geographical region (hereinafter referred to as the "area of interest"). Embodiments of the present invention gather the plurality of historical reference signatures from maps produced by government agencies and from other resources and data available to the public.

A crop rotation is the practice of planting different crops sequentially on the same plot of land to improve soil health, to optimize nutrients in the soil, and to combat pest and weed pressure. A simple crop rotation may involve two or three crops. A more complex crop rotation may involve a dozen or more crops. For example, in year 1, a farmer planted corn in field A. In year 2, the farmer planted beans in field A. The farmer follows this simple crop rotation pattern because corn consumes a great amount of nitrogen and beans return the nitrogen to the soil.

Embodiments of the present invention provide a system and method to receive an aerial image of the area of interest from an optical satellite (i.e., Sentinel-2). Embodiments of the present invention provide a system and method to determine if there is a change in the spatial distribution of a crop growing in the area of interest by calculating the Enhanced Vegetation Index (EVI). The EVI is a modified NDVI with improved sensitivity to high biomass regions and improved vegetation monitoring capabilities. The EVI incorporates both a de-coupling of the canopy background signal and a reduction in atmospheric influences.

The EVI corrects for some atmospheric conditions and canopy background noise and is more sensitive in areas with dense vegetation. The EVI incorporates an "L" value to adjust for canopy background noise and "C" values as coefficients for atmospheric resistance. Additionally, the EVI builds on the pigment absorption feature in the red (600 nm), blue (450 nm), and near-infrared (860 nm) regions of the electromagnetic spectrum. These enhancements allow for a calculation of the EVI as a ratio between the $\rho_{red}$ and $\rho_{nir}$ values as well as a reduction in canopy background noise, atmospheric noise, and saturation.

Written mathematically, the formula to calculate the EVI is:

$$EVI = G \times \frac{\rho_{nir} - \rho_{red}}{\rho_{nir} + (C_1 \times \rho_{red} - C_2 \times \rho_{blue}) + L}$$

and can be rewritten as:

$$EVI = G \times \frac{\frac{\rho_{nir}}{\rho_{red}^{-1}}}{\frac{\rho_{nir}}{\rho_{red}} + \left(C_1 - C_2 \times \frac{\rho_{blue}}{\rho_{red}}\right) + \frac{L}{\rho_{red}}}$$

where L is a soil adjustment factor, and $C_1$ and $C_2$ are coefficients used to correct aerosol scattering in the red band by the use of the blue band. The $\rho_{blue}$, $\rho_{red}$, and $\rho_{nir}$ represent reflectance at the blue (0.45-0.52 μm), red (0.6-0.7 μm), and Near-Infrared wavelengths (0.7-1.1 μm), respectively. In general, G=2.5, $C_1$=6.0, $C_2$=7.5, and L=1.

Embodiments of the present invention provide a system and method to identify the crop growing in the area of interest based on historical data indicative of crop rotation in the area of interest and based on a cross-correlation of the actual crop signature against the plurality of historical reference signatures. Cross-correlation is a measurement that tracks the movements of two or more sets of time series data relative to one another. Cross-correlation is used to compare multiple time series and objectively determine how well they match up with each other and, in particular, at what point the best match occurs. More specifically, cross-correlation refers to the correlation between the entry of two random vectors X and Y. If each of the random vectors X and Y are a scalar random variable that is realized repeatedly in a time series, then the correlations of the various temporal instances of X are known as autocorrelations of X, and the cross-correlations of X with Y across time are temporal cross-correlations. The definition of a correlation includes a standardizing factor in such a way that the correlations have a value between −1 and +1. The closer the cross-correlation value is to +1, the more closely the sets are identical. If X and Y are two independent random variables with probability density functions f and g, respectively, then the probability density of the difference Y−X is formally given by the cross-correlation (f*g); however, this terminology is not used in probability and statistics.

For continuous functions f and g, the cross-correlation is defined as:

$$(f*g)(\tau) \triangleq \int_{-\infty}^{\infty} \overline{f(t)} g(t+\tau) dt$$

which is equivalent to:

$$(f*g)(\tau) \triangleq \int_{-\infty}^{\infty} \overline{f(t-\tau)} g(t) dt,$$

where $\overline{f(t)}$ denotes the complex conjugate of f(t), and τ is the displacement, also known as lag (a feature in f at t occurs in g at t+τ).

If f and g are both continuous periodic functions of period T, the integration from −∞ to ∞ is replaced by integration over any interval $[t_0, t_0+T]$ of length T:

$$(f*g)(\tau) \triangleq \int_{t_0}^{t_0+T} \overline{f(t)} g(t+\tau) dt$$

which is equivalent to:

$$(f*g)(\tau) \triangleq \int_{t_0}^{t_0+T} \overline{f(t-\tau)} g(t) dt.$$

For example, a cross-correlation may be used to find out how much g must be shifted along the x-axis to make it identical to f if the two real value functions f and g differ only by an unknown shift along the x-axis. The formula slides the g function along the x-axis, calculating the integral of their product at each position. When the functions match, the value of (f*g) is maximized.

Implementation of embodiments of the present invention may take a variety of forms, and exemplary implementation details are discussed subsequently with reference to the Figures.

Figure 1:
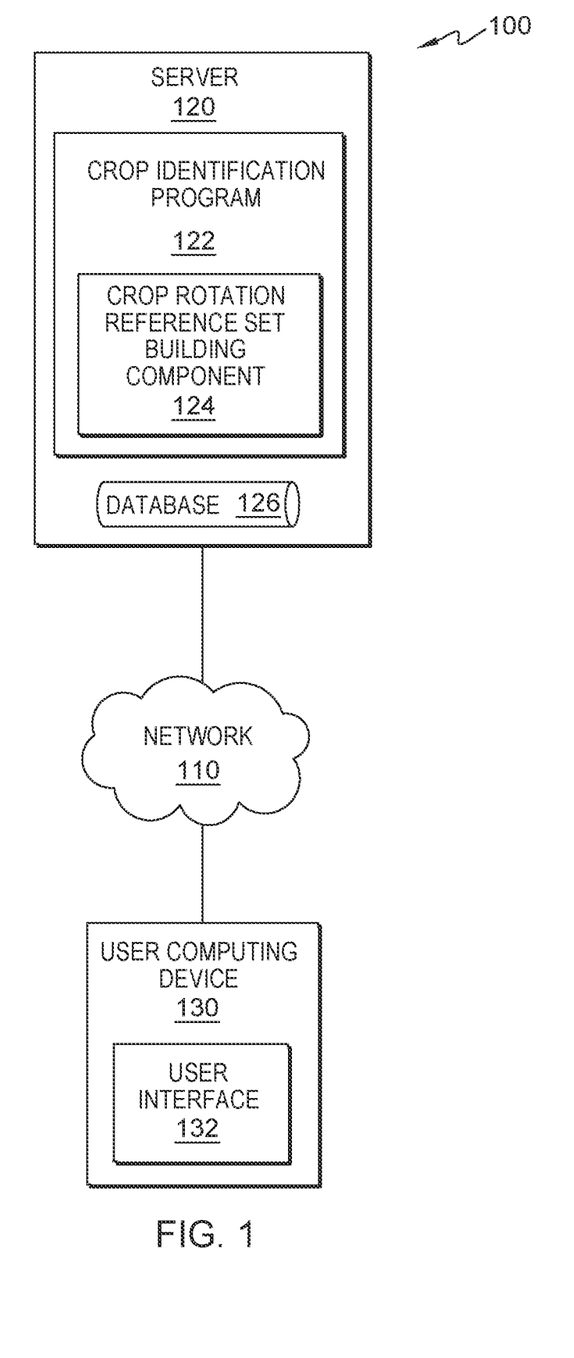
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. In the depicted embodiment, distributed data processing environment 100 includes server 120 and user computing device 130, interconnected over network 110. Distributed data processing environment 100 may include additional servers, computers, computing devices, IoT sensors, and other devices not shown. FIG. 1 provides only an illustration of one embodiment of the present invention and does not imply any limitations with regard to the environments in which different embodiments may be implemented. Many modifications to the depicted environment may be made by those skilled in the art without departing from the scope of the invention as recited by the claims.

Network 110 operates as a computing network that can be, for example, a telecommunications network, a local area network (LAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include voice, data, and video information. In general, network 110 can be any combination of connections and protocols that will support communications between server 120, user computing device 130, and other computing devices (not shown) within distributed data processing environment 100.

Server 120 operates to run crop identification program 122 and to send and/or store data in database 126. In an embodiment, server 120 can send data from database 126 to user computing device 130. In an embodiment, server 120 can receive data in database 126 from user computing device 130. In one or more embodiments, server 120 can be a standalone computing device, a management server, a web server, a mobile computing device, or any other electronic device or computing system capable of receiving, sending, and processing data. In one or more embodiments, server 120 can be a computing system utilizing clustered computers and components (e.g., database server computers, application server computers, etc.) that act as a single pool of seamless resources when accessed within distributed data processing environment 100, such as in a cloud computing environment. In one or more embodiments, server 120 can be a laptop computer, a tablet computer, a netbook computer, a personal computer, a desktop computer, a personal digital assistant, a smart phone, or any programmable electronic device capable of communicating with user computing device 130 and other computing devices (not shown) within distributed data processing environment 100 via network 110. Server 120 may include internal and external hardware components, as depicted and described in further detail in FIG. 4.

Crop identification program 122 operates to identify the crop growing in the area of interest based on historical data indicative of crop rotation in the area of interest and based on a cross-correlation of the actual crop signature against the plurality of historical reference signatures. In the depicted embodiment, crop identification program 122 contains crop rotation reference set building component 124. In the depicted embodiment, crop identification program 122 is a standalone program. In another embodiment, crop identification program 122 may be integrated into another software product. In the depicted embodiment, crop identification program 122 resides on server 120. In other embodiments, crop identification program 122 may reside on user computing device 130 or on another computing device (not shown), provided that crop identification program 122 has access to network 110. The operational steps of crop rotation reference set building component 124 of crop identification program 122 are depicted and described in further detail with respect to FIG. 2. The operational steps of crop identification program 122 are depicted and described in further detail with respect to FIG. 3.

Database 126 operates as a repository for data received, used, and/or generated by crop identification program 122. A database is an organized collection of data. Data includes, but is not limited to, user preferences (i.e., user system settings, output settings, and machine-learned data) and any other data received, used, and/or generated by crop identification program 122. Database 126 can be implemented with any type of device capable of storing data and configuration files that can be accessed and utilized by server 120, such as a hard disk drive, a database server, or a flash memory. In an embodiment, database 126 is accessed by crop identification program 122 to store and/or to access the data. In the depicted embodiment, database 126 resides on server 120. In another embodiment, database 126 may reside on another computing device, server, cloud server, or spread across multiple devices elsewhere (not shown) within distributed data processing environment 100, provided that crop identification program 122 has access to database 126.

User computing device 130 operates to run user interface 132 through which a user can interact with crop identification program 122 on server 120. In an embodiment, user computing device 130 is a device that performs programmable instructions. For example, user computing device 130 may be an electronic device, such as laptop computer, a tablet computer, a netbook computer, a personal computer, a desktop computer, a smart phone, or any programmable electronic device capable of running user interface 132 and communicating (i.e., sending data to and receiving data from) with crop identification program 122 via network 110. In general, user computing device 130 represents any programmable electronic device or a combination of programmable electronic devices capable of executing machine readable instructions and communicating with other communication devices (not shown) within distributed data processing environment 100 via network 110. In the depicted embodiment, user computing device 130 includes an instance of user interface 132. User computing device 130 may include components as described in further detail in FIG. 4.

User interface 132 operates as a local user interface between crop identification program 122 on server 120 and a user of user computing device 130. In some embodiments, user interface 132 is a graphical user interface (GUI), a web user interface (WUI), and/or a voice user interface (VUI) that can display (i.e., visually) or present (i.e., audibly) text, documents, web browser windows, user options, application interfaces, and instructions for operations sent from crop identification program 122 to a user via network 110. User interface 132 can also display or present outputs including information (such as graphics, text, and/or sound) sent from crop identification program 122 to a user via network 110. In an embodiment, user interface 132 is capable of sending and receiving data (i.e., to and from crop identification program 122 via network 110, respectively). Through user interface 132, a user can set user preferences, enter a task to analyze an area of interest, and/or receive outputted information about the crop and the calculated estimate of the amount of crop growing in the area of interest.

As used herein, a user is any individual who is looking to identify the type of crop growing in the area of interest. For example, a user may be a farmer looking to identify the type of crop growing in agricultural fields within the farmer's geographical region in order to estimate the yield of a particular crop in the geographical region prior to harvest so that the farmer can set a seasonal sales price on the crop the farmer is growing. In another example, a user may be a brewing company checking to see how much barley will be available for the company to purchase for the company's brewing process. In another example, a user can be a food processing factory preparing to fulfill supply orders for crops. In another example, a user may be a government agency preparing charts and maps illustrating crop acreage, crop yields, crop areas harvested, and other crop production information. In another example, a user may be a buyer who is assessing the agricultural fields in a geographical region to analyze the agricultural fields' historic and current usages and to predict future crop yields from which the buyer can predict expenses and income of operating an agricultural field. In another example, a user may be an insurer who is analyzing an agricultural field's historic and current usage to create a customized insurance policy.

As used herein, a user preference is a setting that can be customized for a particular user. A set of default user preferences is assigned to each user of crop identification program 122. A user preference editor can be used by the user to change the default user preferences. User preferences that can be customized include, but are not limited to, general user system settings, output settings, and machine-learned data collection and storage settings. Machine-learned data includes, but is not limited to, data regarding past results of iterations of crop identification program 122 and how a user previously responded to or reacted to an output sent by crop identification program 122. Machine-learned data comes from crop identification program 122 self-learning appropriate outputs through tracked user activity and user reactions to received outputs with the purpose of improving each output to better coincide with how the user would react to each individual output.

Figure 2:
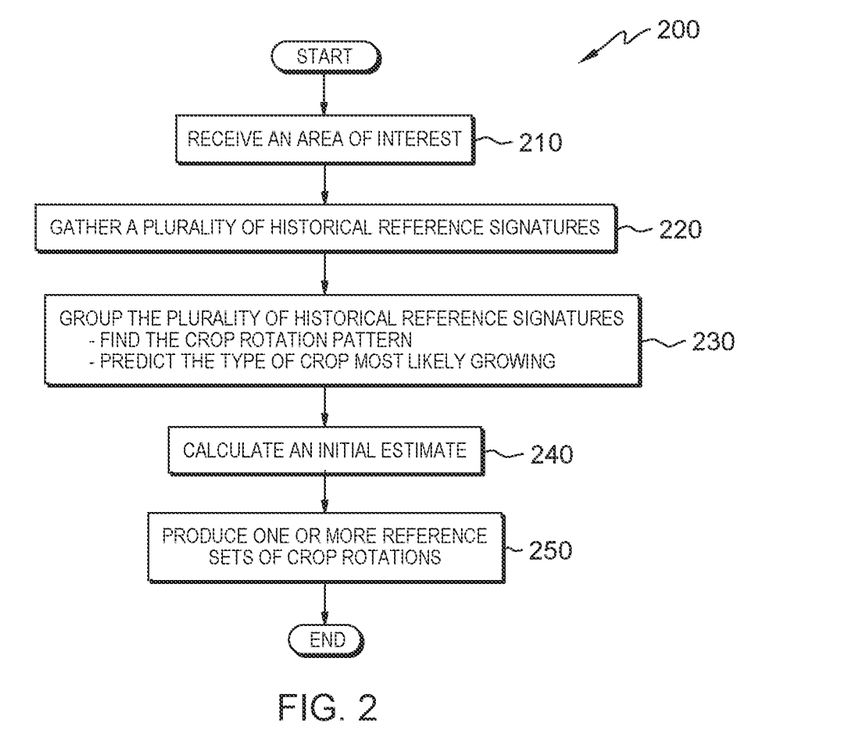
FIG. 2 is a flowchart depicting the operational steps of a crop rotation reference set building component of a crop identification program in a distributed data processing environment, such as the one depicted in FIG. 1, in accordance with an embodiment of the present invention.

FIG. 2 is a flowchart, generally designated 200, depicting the operational steps of crop rotation reference set building component 124 of crop identification program 122 on server 120 in distributed data processing environment 100 of FIG. 1, in accordance with an embodiment of the present invention. In an embodiment, crop rotation reference set building component 124 of crop identification program 122 operates to build one or more reference sets of crop rotations from a plurality of historical reference signatures gathered from maps produced by government agencies and from other resources and data available to the public. It should be appreciated that the process depicted in FIG. 2 illustrates one possible iteration of the process flow, which may be repeated for each area of interest received by crop identification program 122.

In step 210, crop identification program 122 receives an area of interest. In an embodiment, crop identification program 122 receives an area of interest inputted into a control file by a user through user interface 132 of user computing device 130. In an embodiment, crop identification program 122 receives a specified period of time. In an embodiment, crop identification program 122 receives a specified period of time inputted into a control file by a user through user interface 132 of user computing device 130. In an embodiment, crop identification program 122 processes the control file to complete the user's request to identify the type of crop growing in the area of interest during the specified period of time. In an embodiment, crop identification program 122 may complete the user's request to identify the type of crop growing in the area of interest after the crop has been planted but before the crop has sprouted from the ground.

For example, a user, a data scientist who works on behalf of an agricultural company, is asked to identify what type of food crops will be growing in Central Europe during the upcoming growing season from March $1^{st}$ to August $31^{st}$. The data scientist inputs the area of interest, Central Europe, and the specified period of time, March $1^{st}$ to August $31^{st}$, in a control file and initiates the request for crop identification program 122 to identify the type of food crops growing in the area of interest using user interface 132 of user computing device 130. Crop identification program 122 then processes the control file to complete the data scientist's request.

In step 220, crop identification program 122 gathers a plurality of historical reference signatures. In an embodiment, crop identification program 122 gathers a plurality of historical reference signatures recorded for the area of interest. In an embodiment, crop identification program 122 gathers a plurality of historical reference signatures each corresponding to a different known crop. In an embodiment, crop identification program 122 gathers a plurality of historical reference signatures each comprising historical data indicative of changes in the Vegetation Index over a specified period of time (i.e., over a growing season) for the corresponding crop. In an embodiment, crop identification program 122 gathers a plurality of historical reference signatures from maps produced by government agencies. In one or more embodiments, crop identification program 122 gathers a plurality of historical reference signatures from other resources and data available to the public. In an embodiment, responsive to crop identification program 122 receiving an area of interest, crop identification program 122 gathers a plurality of historical reference signatures.

For example, crop identification program 122 gathers a plurality of historical reference signatures corresponding to the food crops—corn, wheat, rice, grain, sorghum, barley, oats, and rye—grown in the area of interest, Central Europe, during the specified period of time, March $1^{st}$ to August $31^{st}$.

In step 230, crop identification program 122 groups the plurality of historical reference signatures. In an embodiment, crop identification program 122 groups the plurality of historical reference signatures recorded for the area of interest. In an embodiment, crop identification program 122 groups the plurality of historical reference signatures recorded for the area of interest by agricultural field. In an embodiment, crop identification program 122 finds the crop rotation pattern for each agricultural field in the area of interest. In an embodiment, crop identification program 122 predicts the type of crop that is most likely be growing in each agricultural field in the area of interest during the specified period of time based on the crop rotation pattern found for each agricultural field. In an embodiment, responsive to crop identification program 122 gathering a plurality of historical reference signatures, crop identification program 122 groups the plurality of historical reference signatures.

In step 240, crop identification program 122 calculates an initial estimate. In an embodiment, crop identification program 122 calculates an initial estimate of the amount of the crop that is most likely growing in each agricultural field in the area of interest during the specified period of time. In an embodiment, crop identification program 122 determines the total acreage of the area of interest. In an embodiment, crop identification program 122 determines the total acreage of each agricultural field in the area of interest. In an embodiment, responsive to crop identification program 122 grouping the plurality of historical reference signatures, crop identification program 122 calculates an initial estimate.

In step 250, crop identification program 122 produces one or more reference sets of crop rotations. In an embodiment, crop identification program 122 produces one or more reference sets of crop rotations for each agricultural field in the area of interest. In an embodiment, crop identification program 122 produces one or more reference sets of crop rotations containing the type of crop and the initial estimate of the amount of the crop that is most likely growing in each agricultural field in the area of interest during the specified period of time. There may be multiple crop rotation patterns. The one or more reference sets of crop rotations produced by crop identification program 122 covers the multiple crop rotation patterns.

In an embodiment, crop identification program 122 assigns a rotation probability to the one or more reference sets of crop rotations produced. In an embodiment, crop identification program 122 assigns a rotation probability to the one or more reference sets of crop rotations produced based on the frequency of occurrence of the set. The assigned rotation probability may be used to assert that, given the agricultural field is in a certain crop rotation, the type of crop that is most likely planted during the specified period of time will be X, which has the highest rotation probability. In an embodiment, crop identification program 122 stores the one or more reference sets of crop rotations in a database, e.g., database 126. In an embodiment, responsive to crop identification program 122 calculating an initial estimate, crop identification program 122 produces one or more reference sets of crop rotations.

Figure 3:
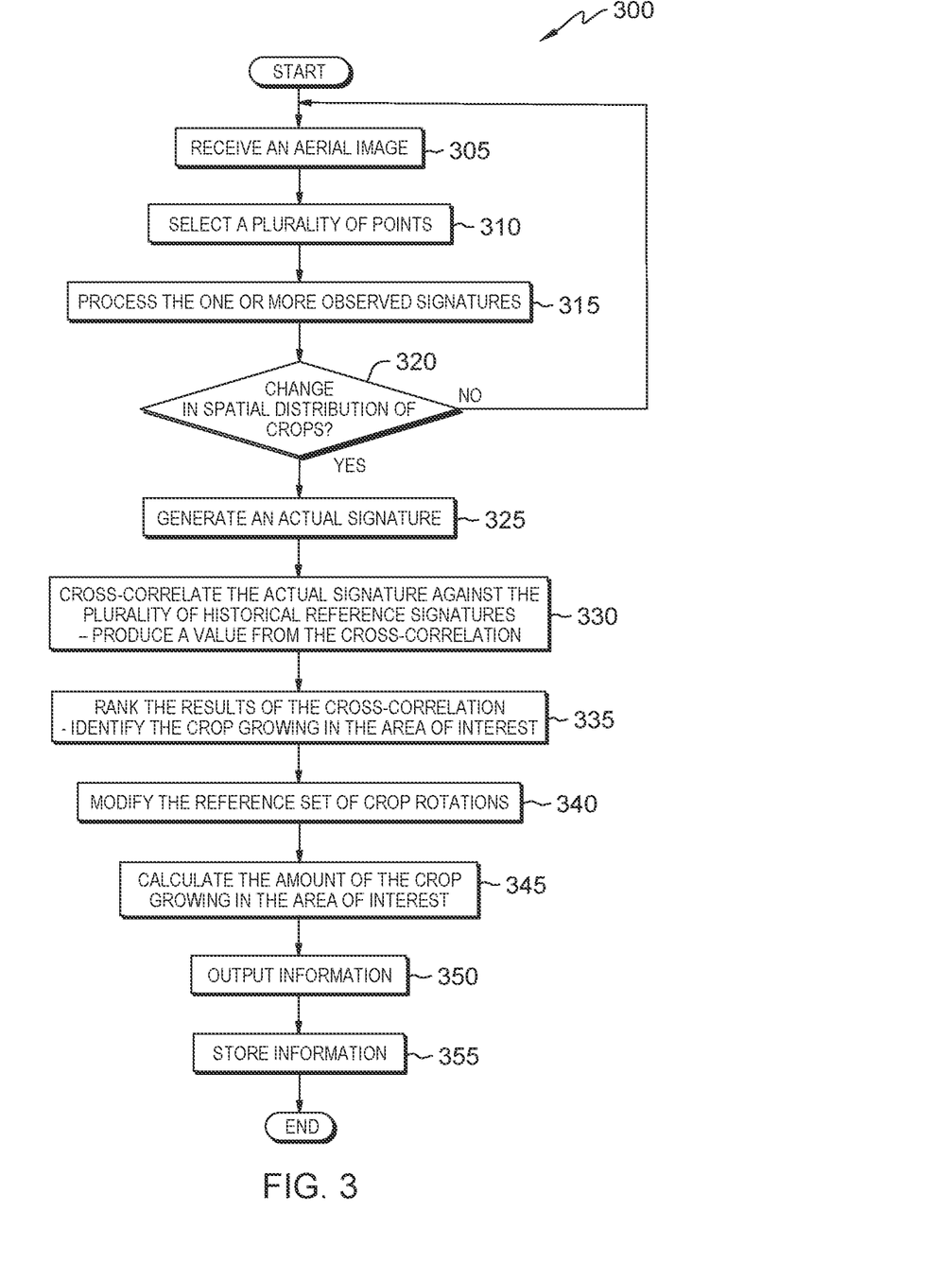
FIG. 3 is a flowchart depicting the operational steps of a crop identification program in a distributed data processing environment, such as the one depicted in FIG. 1, in accordance with an embodiment of the present invention.

FIG. 3 is a flowchart, generally designated 300, depicting the operational steps of crop identification program 122 on server 120 in distributed data processing environment 100 of FIG. 1, in accordance with an embodiment of the present invention. In an embodiment, crop identification program 122 operates to receive an aerial image of the area of interest from an optical satellite. In an embodiment, crop identification program 122 operates to determine if there is a change in the spatial distribution of crops growing at the plurality of points selected across the area of interest by calculating the Enhanced Vegetation Index. In an embodiment, crop identification program 122 operates to identify the crop growing in the area of interest based on historical data indicative of crop rotation in the area of interest and based on a cross-correlation of the actual crop signature with the plurality of historical reference signatures. It should be appreciated that the process depicted in FIG. 3 illustrates one possible iteration of the process flow, which may be repeated for each aerial image of the area of interest received by crop identification program 122.

In step 305, crop identification program 122 receives an aerial image. In an embodiment, crop identification program 122 receives an aerial image of the area of interest. In an embodiment, crop identification program 122 receives an aerial image of the area of interest from an optical satellite (i.e., from Sentinel-2 at 10 m resolution). In an embodiment, crop identification program 122 receives an aerial image of the area of interest during the specified period of time, i.e., beginning as soon as possible after the crop emerges and continuing until the crop is fully grown, e.g., March $1^{st}$ until August $31^{st}$. In an embodiment, crop identification program 122 receives an aerial image at a pre-determined interval of time, e.g., every five days for X number of days.

In step 310, crop identification program 122 selects a plurality of points. In an embodiment, crop identification program 122 selects a plurality of points across the area of interest. The number of points selected is dependent on the overall acreage of the area of interest. In an embodiment, crop identification program 122 selects a plurality of points across the area of interest at random. In an embodiment, crop identification program 122 selects a plurality of points across the area of interest at a fixed distance from another point. The fixed distance from the other point is dependent on the overall acreage of the area of interest. Each point represents a sample of a crop growing in the area of interest.

In an embodiment, crop identification program 122 clips the aerial image. In an embodiment, crop identification program 122 clips the aerial image into one or more smaller images. In an embodiment, crop identification program 122 clips the aerial image into one or more smaller images in order to isolate the areas that contain the plurality of points. The one or more smaller images generated through the clipping process will hereinafter be referred to as the "one or more observed signatures". In an embodiment, responsive to crop identification program 122 receiving an aerial image, crop identification program 122 selects a plurality of points.

In step 315, crop identification program 122 processes the one or more observed signatures. In an embodiment, crop identification program 122 processes the one or more observed signatures using an algorithm. In an embodiment, crop identification program 122 processes the one or more observed signatures in order to detect and to remove clouds and shadows present at the pixel level. The presence of clouds and shadows in remotely sensed images will distort the results of a change analysis. In an embodiment, responsive to crop identification program 122 selecting a plurality of points, crop identification program 122 processes the one or more observed signatures.

In decision 320, crop identification program 122 determines if there is a change in the spatial distribution of the crops. Spatial distribution refers to the arrangement of a phenomenon across the Earth's surface. Phenomenon refers to an observable fact or event. In an embodiment, crop identification program 122 determines if there is a change in the spatial distribution of the crops growing at the plurality of points selected across the area of interest. In an embodiment, crop identification program 122 determines if there is a change in the spatial distribution of the crops growing at the plurality of points by calculating the Vegetation Index (i.e., the Enhanced Vegetation Index) of the one or more observed signatures.

In an embodiment, crop identification program 122 determines if there is a change in the Vegetation Index. A change in the Vegetation Index correlates to a change in the spatial distribution of the crops. In an embodiment, crop identification program 122 compares the Vegetation Index of the one or more observed signatures to the Vegetation Index of the crop identified in the reference set of crop rotations as the type of crop most likely growing in the area of interest during the specified period of time. In an embodiment, crop identification program 122 determines there is a change in the Vegetation Index when the Vegetation Index of the one or more observed signatures departs from a threshold value. The threshold value is set at and equivalent to the Vegetation Index of the crop identified in the reference set of crop rotations as the type of crop most likely growing in the area of interest during the specified period of time. A difference between the two Vegetation Indices indicates the crop identified in the reference set of crop rotations as the type of crop most likely growing in the area of interest during the specified period of time is not the correct type of crop.

If crop identification program 122 determines there is no change in the spatial distribution of the crops (decision 320, NO branch), then crop identification program 122 waits until another aerial image is received (step 305). In an embodiment, crop identification program 122 stores the one or more observed signatures in a database, e.g., database 126. In an embodiment, crop identification program 122 builds up the observed signature in the vector by increasing the length of the vector in storage for that season.

If crop identification program 122 determines there is a change in the spatial distribution of the crops (decision 320, YES branch), then crop identification program 122 proceeds to step 325, generating an actual signature.

In an embodiment, responsive to crop identification program 122 processing the one or more observed signatures, crop identification program determines if there is a change in the spatial distribution of the crops.

In step 325, crop identification program 122 generates an actual signature. In an embodiment, crop identification program 122 generates an actual signature from the one or more observed signatures. The actual signature is a representation of the one or more observed signatures. In an embodiment, responsive to crop identification program 122 determining there is a change in the spatial distribution of the crops, crop identification program 122 generates an actual signature.

In step 330, crop identification program 122 cross-correlates the actual signature against the plurality of historical reference signatures. In an embodiment, crop identification program 122 cross-correlates the actual signature against the plurality of historical reference signatures by calculating the degree of similarity between the signatures. In an embodiment, crop identification program 122 produces a value from the cross-correlation of the actual signature against the plurality of historical reference signatures. The value produced from the cross-correlation ranges from 0 to 1 indicating no correlation to complete correlation, respectively, between the signatures. In an embodiment, responsive to crop identification program 122 generating an actual signature, crop identification program 122 cross-correlates the actual signature against the plurality of historical reference signatures.

In step 335, crop identification program 122 ranks the results of the cross-correlation of the actual signature against the plurality of historical reference signatures. In an embodiment, crop identification program 122 ranks the results of the cross-correlation of the actual signature against the plurality of historical reference signatures based on the value produced from the cross-correlation, i.e., ranks the cross-correlated actual signatures and historical reference signatures from no correlation to complete correlation, e.g., the actual signature that completely correlates with a historical reference signature ranks higher than the actual signature that is not correlated with a historical reference signature. In an embodiment, crop identification program 122 ranks the results of the cross-correlation of the actual signature against the plurality of historical reference signatures to identify the crop growing in the area of interest. The highest ranked historical reference signature is the crop growing in the area of interest. In some embodiments, crop identification program 122 selects the best estimate or fit if one or more results of the cross-correlation of the actual signature against the plurality of historical reference signatures produces the same value and, therefore, are tied for the same rank (e.g., tied for the highest ranking).

In an embodiment, crop identification program 122 identifies the crop growing in the area of interest. In an embodiment, responsive to crop identification program 122 cross-correlating the actual signature against the plurality of historical reference signatures, crop identification program 122 ranks the results of the cross-correlation of the actual signature against the plurality of historical reference signatures.

In step 340, crop identification program 122 modifies the reference set of crop rotations. In an embodiment, crop identification program 122 modifies the reference set of crop rotations to reflect the proper crop growing in the area of interest. In an embodiment, responsive to crop identification program 122 ranking the results of the cross-correlation of the actual signature against the plurality of historical reference signatures, crop identification program 122 modifies the reference set of crop rotations.

In step 345, crop identification program 122 calculates the amount of the crop growing in the area of interest. In an embodiment, crop identification program 122 aggregates the amount of a crop if the crop is growing in more than one agricultural field in the area of interest. In an embodiment, responsive to crop identification program 122 modifying the reference set of crop rotations, crop identification program 122 calculates the amount of the crop growing in the area of interest.

In step 350, crop identification program 122 outputs information. In an embodiment, crop identification program 122 outputs information on the crop and the calculated estimate of the amount of crop growing in the area of interest. In an embodiment, crop identification program 122 outputs information on the crop and the calculated estimate of the amount of crop growing in the area of interest to the user through user interface 132 of user computing device 130. In an embodiment, responsive to crop identification program 122 calculating the amount of the crop growing in the area of interest, crop identification program 122 outputs information.

In step 355, crop identification program 122 stores the information. In an embodiment, crop identification program 122 stores the information on the crop and the calculated estimate of the amount of crop growing in the area of interest. In an embodiment, crop identification program 122 stores the information on the crop and the calculated estimate of the amount of crop growing in the area of interest in a database, e.g., database 126. In an embodiment, responsive to crop identification program 122 outputting information, crop identification program 122 stores the information.

Figure 4:
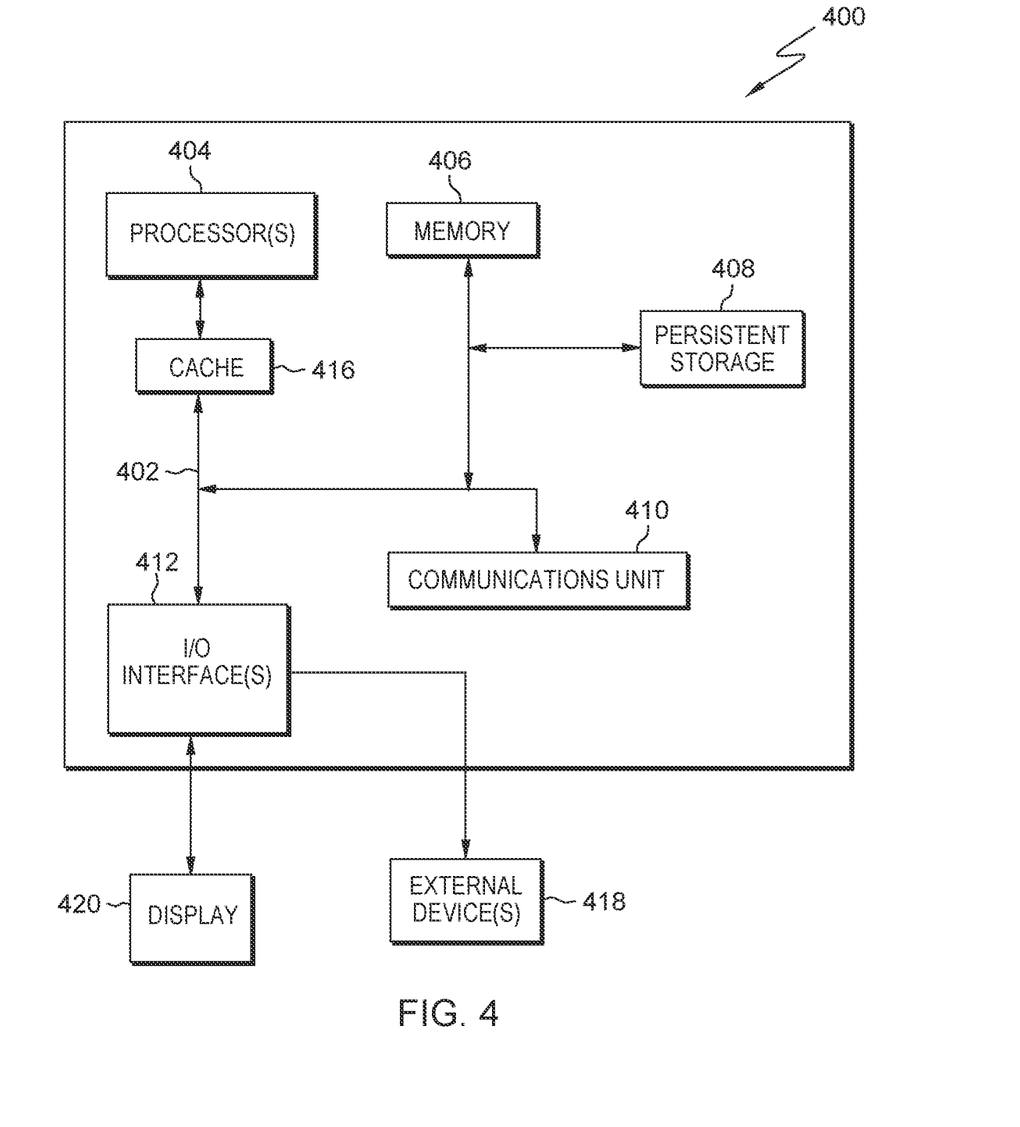
FIG. 4 is a block diagram of the components of a computing device of the distributed data processing environment of FIG. 1, in accordance with an embodiment of the present invention.

FIG. 4 is a block diagram of the components of computing device 400, suitable for server 120 and/or user computing device 130 in distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Computing device 400 includes communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Programs may be stored in persistent storage 408 and in memory 406 for execution and/or access by one or more of the respective computer processors 404 via cache 416. In an embodiment, persistent storage 408 includes a magnetic hard disk drive. Alternatively, or in addition to a magnetic hard disk drive, persistent storage 408 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Programs may be downloaded to persistent storage 408 through communications unit 410.

I/O interface(s) 412 allows for input and output of data with other devices that may be connected to server 120 and/or user computing device 130. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

Programs described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   receiving, by one or more processors, an aerial image of one or more agricultural fields in a pre-determined geographical region from an optical satellite at a pre-determined interval of time during a growing season of one or more crops;
   selecting, by one or more processors, a plurality of points across the one or more agricultural fields in the pre-determined geographical region from the aerial image;
   clipping, by one or more processors, the aerial image into one or more smaller images focusing on the plurality of points selected across the one or more agricultural fields in the pre-determined geographical region;
   generating, by one or more processors, one or more observed signatures from the one or more smaller images focused on the plurality of points selected across the one or more agricultural fields in the pre-determined geographical region;
   determining, by one or more processors, there is a change in a spatial distribution of the one or more crops growing at the plurality of points selected across the one or more agricultural fields in the pre-determined geographical region;
   generating, by one or more processors, an actual signature from the one or more observed signatures;
   cross-correlating, by one or more processors, the actual signature against a plurality of historical reference signatures to determine a degree of similarity between the actual signature and the plurality of historical reference signatures;
   producing, by one or more processors, a value from a cross-correlation of the actual signature against the plurality of historical reference signatures;
   ranking, by one or more processors, one or more results of the cross-correlation of the actual signature against the plurality of historical reference signatures;
   identifying, by one or more processors, the one or more crops growing in the one or more agricultural fields in the pre-determined geographical region; and
   calculating, by one or more processors, a first estimate of an amount of the one or more crops growing in the one or more agricultural fields in the pre-determined geographical region.

2. The computer-implemented method of claim 1 further comprising:
   prior to receiving the aerial image, gathering, by one or more processors, the plurality of historical reference signatures for the one or more agricultural fields in the pre-determined geographical region;
   finding, by one or more processors, a crop rotation pattern for the one or more agricultural fields in the pre-determined geographical region;
   predicting, by one or more processors, the one or more crops growing in the one or more agricultural fields in the pre-determined geographical region based on the crop rotation pattern;
   calculating, by one or more processors, a second estimate of an amount of the one or more crops predicted to be growing in the one or more agricultural fields in the pre-determined geographical region;
   producing, by one or more processors, one or more reference sets of crop rotations for the one or more agricultural fields in the pre-determined geographical region;
   assigning, by one or more processors, a rotation probability to the one or more reference sets of crop rotations for the one or more agricultural fields in the pre-determined geographical region; and
   storing, by one or more processors, the one or more reference sets of crop rotations for the one or more agricultural fields in the pre-determined geographical region in a database.

3. The computer-implemented method of claim 1 further comprising:
subsequent to calculating the first estimate, outputting, by one or more processors, information on the one or more crops growing in the one or more agricultural fields in the pre-determined geographical region and the first estimate of the amount of the one or more crops growing in the one or more agricultural fields in the pre-determined geographical region; and
storing, by one or more processors, the information on the one or more crops growing in the one or more agricultural fields in the pre-determined geographical region and the first estimate of the one or more crops growing in the one or more agricultural fields in the pre-determined geographical region in the database.

4. The computer-implemented method of claim 1, wherein the optical satellite is a Sentinel-2 satellite at 10 m resolution.

5. The computer-implemented method of claim 1, wherein determining there is a change in the spatial distribution of the one or more crops growing at the plurality of points selected across the one or more agricultural fields in the pre-determined geographical region further comprises:
calculating, by one or more processors, an Enhanced Vegetation Index of the one or more observed signatures using a formula $$EVI = G \times \frac{\rho_{nir} - \rho_{red}}{\rho_{nir} + (C_1 \times \rho_{red} - C_2 \times \rho_{blue}) + L};$$

and
comparing, by one or more processors, the Enhanced Vegetation Index of the one or more observed signatures to the Enhanced Vegetation Index of the plurality of historical reference signatures.

6. The computer-implemented method of claim 1, wherein:
the cross-correlation of the actual signature against the plurality of historical reference signatures is defined as $(f*g)(\tau) \triangleq \int_{-\infty}^{\infty} \overline{f(t)} g(t+\tau) dt$;
$\overline{f(t)}$ denotes the complex conjugate of $f(t)$; and
$\tau$ is a displacement.

7. The computer-implemented method of claim 1, wherein the value produced from the cross-correlation of the actual signature against the plurality of historical reference signatures ranges from zero to one, in which zero indicates no correlation and one indicates complete correlation, between the actual signature and the plurality of historical reference signatures.

8. The computer-implemented method of claim 1, wherein the one or more results of the cross-correlation of the actual signature against the plurality of historical reference signatures are ranked from no correlation to complete correlation based on the value produced.

9. The computer-implemented method of claim 1, wherein the one or more crops identified as the one or more crops growing in the one or more agricultural fields in the pre-determined geographical region is the highest ranked historical reference signature.

10. A computer program product comprising:
one or more computer readable storage media, wherein the one or more computer readable storage media is not a transitory signal per se, and program instructions stored on the one or more computer readable storage media, the program instructions comprising:
program instructions to receive an aerial image of one or more agricultural fields in a pre-determined geographical region from an optical satellite at a pre-determined interval of time during a growing season of one or more crops;
program instructions to select a plurality of points across the one or more agricultural fields in the pre-determined geographical region from the aerial image;
program instructions to clip the aerial image into one or more smaller images focusing on the plurality of points selected across the one or more agricultural fields in the pre-determined geographical region;
program instructions to generate one or more observed signatures from the one or more smaller images focused on the plurality of points selected across the one or more agricultural fields in the pre-determined geographical region;
program instructions to determine there is a change in a spatial distribution of the one or more crops growing at the plurality of points selected across the one or more agricultural fields in the pre-determined geographical region;
program instructions to generate an actual signature from the one or more observed signatures;
program instructions to cross-correlate the actual signature against a plurality of historical reference signatures to determine a degree of similarity between the actual signature and the plurality of historical reference signatures;
program instructions to produce a value from a cross-correlation of the actual signature against the plurality of historical reference signatures;
program instructions to rank one or more results of the cross-correlation of the actual signature against the plurality of historical reference signatures based on the value produced;
program instructions to identify the one or more crops growing in the one or more agricultural fields in the pre-determined geographical region; and
program instructions to calculate a first estimate of an amount of the one or more crops growing in the one or more agricultural fields in the pre-determined geographical region.

11. The computer program product of claim 10 further comprising:
prior to receiving the aerial image, program instructions to gather the plurality of historical reference signatures for the one or more agricultural fields in the pre-determined geographical region;
program instructions to find a crop rotation pattern for the one or more agricultural fields in the pre-determined geographical region;
program instructions to predict the one or more crops growing in the one or more agricultural fields in the pre-determined geographical region based on the crop rotation pattern;
program instructions to calculate a second estimate of an amount of the one or more crops predicted to be growing in the one or more agricultural fields in the pre-determined geographical region;
program instructions to produce one or more reference sets of crop rotations for the one or more agricultural fields in the pre-determined geographical region;
program instructions to assign a rotation probability to the one or more reference sets of crop rotations for the one or more agricultural fields in the pre-determined geographical region; and program instructions to store the one or more reference sets of crop rotations for the one or more agricultural fields in the pre-determined geographical region in a database.

12. The computer program product of claim 10 further comprising:
    subsequent to calculating the first estimate, program instructions to output information on the one or more crops growing in the one or more agricultural fields in the pre-determined geographical region and the first estimate of the amount of the one or more crops growing in the one or more agricultural fields in the pre-determined geographical region; and
    program instructions to store the information on the one or more crops growing in the one or more agricultural fields in the pre-determined geographical region and the first estimate of the one or more crops growing in the one or more agricultural fields in the pre-determined geographical region in the database.

13. The computer program product of claim 10, wherein determining there is a change in the spatial distribution of the one or more crops growing at the plurality of points selected across the one or more agricultural fields in the pre-determined geographical region further comprises:
    program instructions to calculate an Enhanced Vegetation Index of the one or more observed signatures using a formula $$EVI = G \times \frac{\rho_{nir} - \rho_{red}}{\rho_{nir} + (C_1 \times \rho_{red} - C_2 \times \rho_{blue}) + L};$$

and
    program instructions to compare the Enhanced Vegetation Index of the one or more observed signatures to the Enhanced Vegetation Index of the plurality of historical reference signatures.

14. The computer program product of claim 10, wherein:
    the cross-correlation of the actual signature against the plurality of historical reference signatures is defined as $(f*g)(\tau)(f*g)(\tau) \triangleq \int_{-\infty}^{\infty} \overline{f(t)} g(t+\tau) dt$;
    $\overline{f(t)}$ denotes the complex conjugate of f(t); and
    $\tau$ is a displacement.

15. The computer program product of claim 10, wherein the one or more crops identified as the one or more crops growing in the one or more agricultural fields in the pre-determined geographical region is the highest ranked historical reference signature.

16. A computer system comprising:
    one or more computer processors;
    one or more computer readable storage media;
    program instructions collectively stored on the one or more computer readable storage media for execution by at least one of the one or more computer processors, the stored program instructions comprising:
    program instructions to receive an aerial image of one or more agricultural fields in a pre-determined geographical region from an optical satellite at a pre-determined interval of time during a growing season of one or more crops;
    program instructions to select a plurality of points across the one or more agricultural fields in the pre-determined geographical region from the aerial image;
    program instructions to clip the aerial image into one or more smaller images focusing on the plurality of points selected across the one or more agricultural fields in the pre-determined geographical region;
    program instructions to generate one or more observed signatures from the one or more smaller images focused on the plurality of points selected across the one or more agricultural fields in the pre-determined geographical region;
    program instructions to determine there is a change in a spatial distribution of the one or more crops growing at the plurality of points selected across the one or more agricultural fields in the pre-determined geographical region;
    program instructions to generate an actual signature from the one or more observed signatures;
    program instructions to cross-correlate the actual signature against a plurality of historical reference signatures to determine a degree of similarity between the actual signature and the plurality of historical reference signatures;
    program instructions to produce a value from a cross-correlation of the actual signature against the plurality of historical reference signatures;
    program instructions to rank one or more results of the cross-correlation of the actual signature against the plurality of historical reference signatures based on the value produced;
    program instructions to identify the one or more crops growing in the one or more agricultural fields in the pre-determined geographical region; and
    program instructions to calculate a first estimate of an amount of the one or more crops growing in the one or more agricultural fields in the pre-determined geographical region.

17. The computer system of claim 16 further comprising:
    prior to receiving the aerial image, program instructions to gather the plurality of historical reference signatures for the one or more agricultural fields in the pre-determined geographical region;
    program instructions to find a crop rotation pattern for the one or more agricultural fields in the pre-determined geographical region;
    program instructions to predict the one or more crops growing in the one or more agricultural fields in the pre-determined geographical region based on the crop rotation pattern;
    program instructions to calculate a second estimate of an amount of the one or more crops predicted to be growing in the one or more agricultural fields in the pre-determined geographical region;
    program instructions to produce one or more reference sets of crop rotations for the one or more agricultural fields in the pre-determined geographical region;
    program instructions to assign a rotation probability to the one or more reference sets of crop rotations for the one or more agricultural fields in the pre-determined geographical region; and
    program instructions to store the one or more reference sets of crop rotations for the one or more agricultural fields in the pre-determined geographical region in a database.

18. The computer system of claim 16 further comprising:
    subsequent to calculating the first estimate, program instructions to output information on the one or more crops growing in the one or more agricultural fields in the pre-determined geographical region and the first estimate of the amount of the one or more crops growing in the one or more agricultural fields in the pre-determined geographical region; and program instructions to store the information on the one or more crops growing in the one or more agricultural fields in the pre-determined geographical region and the first estimate of the one or more crops growing in the one or more agricultural fields in the pre-determined geographical region in the database.

19. The computer system of claim 16, wherein determining there is a change in the spatial distribution of the one or more crops growing at the plurality of points selected across the one or more agricultural fields in the pre-determined geographical region further comprises:

program instructions to calculate an Enhanced Vegetation Index of the one or more observed signatures using a formula $$EVI = G \times \frac{\rho_{nir} - \rho_{red}}{\rho_{nir} + (C_1 \times \rho_{red} - C_2 \times \rho_{blue}) + L};$$

and program instructions to compare the Enhanced Vegetation Index of the one or more observed signatures to the Enhanced Vegetation Index of the plurality of historical reference signatures.

20. The computer system of claim 16, wherein:

the cross-correlation of the actual signature against the plurality of historical reference signatures is defined as $(f*g)(\tau) \triangleq (f*g)(\tau) \int_{-\infty}^{\infty} \overline{f(t)} g(t+\tau) dt$;

$\overline{f(t)}$ denotes the complex conjugate of f(t); and $\tau$ is a displacement.

\* \* \* \* \*